United States Patent Office 3,709,850
Patented Jan. 9, 1973

3,709,850
PURIFICATION OF POLYOLEFINS
Roy C. Harrison and Donald L. Crain, Bartlesville, Okla., assignors to Phillips Petroleum Company
No Drawing. Filed Feb. 16, 1971, Ser. No. 115,792
Int. Cl. C08f 1/88, 3/08
U.S. Cl. 260—93.7
16 Claims

ABSTRACT OF THE DISCLOSURE

A treating process for removing catalyst residue from polyolefins by combining a polyolefin with an aqueous solution of a fluorinated organic material and agitating said materials together at a temperature in the range of 200–275° F. for a time period in the range of from about 5 to 60 minutes. In another embodiment the polyolefin can be dissolved in a solvent and thereafter agitated at a temperature in the range of 65–275° F.

---

This invention relates to a method for purifying crude amorphous polyolefins. It further relates to the separation of amorphous polyolefins from catalyst residues and other contaminants.

In the production of crystalline polyolefins, there is also produced varying amounts of presently unusable material, amorphous polyolefins. The amorphous material usually is darkly discolored, contains considerable amounts of catalyst residues, is highly viscous, corrosive, and quite flammable. Present methods of disposal include burying or incinerating, both of which result in considerable cost, waste, and potential ground or atmospheric pollution.

The crude amorphous polyolefins as produced are worthless because of the content of catalyst residues and other contaminants. However, the amorphous polyolefins potentially are valuable materials, once freed of contaminating agents. They have potential usages as electrical cable filler fluids, as hot melt adhesive components, and the like. Prime methods of recovery have included treatment with organic acids, alcohols, hot water, caustics or various combinations of these materials.

An object of this invention is to cover useful refined amorphous polyolefins. Another object of this invention is to separate catalyst residues from crude amorphous polyolefins. Yet another object of this invention is to avoid or reduce further wastage of potentially valuable polymeric materials.

Other aspects, objects and advantages of this invention will become apparent to one skilled in the art from a study of the disclosure and the appended claims.

In the method of this invention, a crude amorphous polyolefin being one of the polymeric products of polymerization under polymerization conditions of at least one monoolefin containing from 2 to about 8 carbon atoms together with from 0 to about 25 weight percent of a comonomer selected from the same group of monoolefins polymerizable therewith and a polymerization catalyst which leaves metal-containing catalyst residues in said polyolefin is agitated and washed to remove the catalyst residue and other contaminants and thereby purify said crude amorphous polyolefin.

Examples of the crude amorphous polyolefins that can be purified by this invention, among others, are: polypropylene, polybutene, poly(propylene-ethylene)copolymer, polypentene, polyhexene, and poly(propylene-butene-1) copolymer.

The polymerization catalysts that can be used for forming the polyolefin are, among others, for example, aluminum trialkyls and titanium halides, aluminum dialkyl monohalides and titanium trichloride, organoboron compounds and vanadium halides, etc.

In the production of crystalline polypropylene, for example, the amorphous polypropylene by-product is soluble in the hydrocarbon solvent used, therefore the crystalline polypropylene is separated from the undesired amorphous polypropylene by-product by a filtration or settling step known in the art.

These polyolefins, copolymers, and catalysts used for the polymerization process and the method of polymerizing to form crude amorphous polyolefins are well known in the art.

For the washing and purification process of this invention, an aqueous solution of fluorinated organic materials is formed with the concentration of said fluorinated organic material being about 0.01–1.0 weight percent, preferably 0.05–0.5 weight percent. At concentrations lower than about 0.01 weight percent the purification process requires excessive amounts of water, time, and labor whereas concentrations greater than about 1.0 weight percent provide no additional purification efficiency at higher costs.

The fluorinated organic material utilized to form the aqueous solution of this invention has a formula of $$[C_nF_{n+1}X_n]A^-B^+$$

where:

$n$=An integer in the range of 4–20
X=F, Cl, Br, or H
$A^-$=COO$^-$, SO$_3^-$, or PO$_4$H$^-$
$B^+$=Na$^+$, K$^+$, NH$_4^+$, or H$^+$ Examples of these fluorinated organic materials are as follows:

sodium perfluorohexanoate
sodium perfluorooctanoate
potassium perfluoropalmitate
NH$_4$-perfluorostearate
sodium perfluoroheptylsulfonate
potassium perfluoroduodecylsulfonate
NH$_4$-perfluorooctylphosphate
sodium perfluoropentadecylsulfonate
sodium salt of perfluoroctanoic acid or mixtures thereof.

The polyolefin to be purified is combined with selected aqueous, fluorinated organic materials in solution in a vessel containing stirring or mixing apparatus, as known in the art. The vessel is preferably glass-lined or stainless steel equipment.

The combined polyolefin and aqueous solution portion is thereafter agitated, or stirred together at a temperature in the range of about 200–275° F., preferably 240–260° F., for a time period in the range of from about 5–60 minutes. At temperatures less than about 200° F., the polymer has a tendency to become tacky and could foul equipment, and at temperatures greater than about 275° F. a big pressure vessel must be used.

It is within the scope of the invention to utilize a solution of the amorphous polymer in a suitable hydrocarbon solvent such as propane, butane, cyclohexane, heptane, or mixtures thereof. This permits operation at temperatures as low as 65° F.

The purified polyolefin can thereafter be recovered for further processing by flashing of the hydrocarbon solution where said polyolefin is in solution, filtration of the aqueous slurry or decantation or other methods known in the art.

In some instances it may be desirable to pass the polyolefin through a plurality of wash cycles in order to obtain a resultant polyolefin having a certain desired purity. Each successive wash cycle can be conducted using a new portion of the same aqueous, fluorinated organic material or changing the solution to aqueous solutions of other organic materials as set forth above. Where repeated washing cycles are utilized, it is preferred that said agitation period have a duration in the range of about 20–40 minutes. At periods of time less than about 20 minutes, there is a waste of the aqueous solution and at periods longer than about 40 minutes, there is a waste of equipment and labor.

Where cyclic washings are employed, the polyolefin is removed from the initial aqueous solution and thereafter combined with another aqueous solution of the second washing cycle. An intermediate step can be employed where the polyolefin is rinsed with water. This rinsing between washing cycles is beneficial in further removing contaminants from the polyolefin. It has also been found that polyolefin of desirable purity can be obtained by cyclic washings having, preferably, at least three washing cycles.

An example of the method of this invention is as follows:

EXAMPLE 220 grams of brown crude amorphous polypropylene was vigorously stirred at 250° F. in 500 cc. of water containing 0.1 percent by weight of sodium perfluorooctanoate; the salt was prepared by neutralizing perfluorooctanoic acid with .1 N sodium hydroxide solution.

Heating or stirring was continued for 30 minutes. The solution was allowed to settle and the brown, cloudy supernatant liquid was decanted.

Another 500 cc. portion of the wash solution was added and the procedure repeated. A sample of the settled polymer, after decantation, was examined for acetylacetone. The concentration had declined from an original value of 49,800 p.p.m. to less than 21 p.p.m. Acetylacetone is a chelating agent added to solubilize the metal components of the spent catalyst and thus permit removal of the soluble catalyst residue by washing. Therefore, acetylacetone removal during washing is an indication of metal removal. The acetylacetone is added as a means for deactivating the catalyst and removing same from the crystalline polypropylene during the recovery process. The acetylacetone is added in a liquid form.

A third washing was carried out and the acetylacetone had dropped to an acceptable value of less than 5 p.p.m. and the amorphous polypropylene was now off-white.

Other modifications and alterations of this invention will become apparent to those skilled in the art from the foregoing discussion and example, and it should be understood that this invention is not to be unduly limited thereto.

What is claimed is:

1. A process for the purification of crude amorphous polyolefin, said polyolefin being one of the polymeric products of polymerization under polymerization conditions of at least one monoolefin containing from 2 to about 8 carbon atoms together with from 0 to about 25 weight percent of a comonomer polymerizable therewith and a polymerization catalyst which leaves metal-containing catalyst residues in said polyolefin, comprising:
combining the polyolefin with an aqueous solution of fluorinated organic material selected from a group of materials represented by the formula

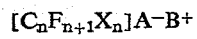

where:

$n=$ an integer in the range of 4–20
$X=$ F, Cl, Br, or H
$A^-=$ COO$^-$, SO$_3^-$, or PO$_4$H$^-$
$B^+=$ Na$^+$, K$^+$, NH$_4^+$, or H$^+$ with said fluorinated organic materials being in the range of about 0.01 to 1.0 weight percent; and
agitating said combined polyolefin and aqueous solution together at a temperature in the range of about 200–275° F. for a time period in the range of from about 5–60 minutes.

2. A process, as set forth in claim 1, wherein the combined polyolefin and aqueous solution is agitated for at least one period of time in the range of about 20–40 minutes.

3. A process, as set forth in claim 2, including removing the agitated polyolefin from the aqueous solution and thereafter combining and agitating the polyolefin with other volumes of the aqueous solution.

4. A process, as set forth in claim 3, wherein the polyolefin is removed and agitated with another volume of the aqueous solution at least twice.

5. A process, as set forth in claim 1, wherein the polyolefin and aqueous solution is agitated at a temperature in the range of about 240–260° F.

6. A process, as set forth in claim 1, wherein the fluorinated organic materials are in the range of about 0.05–0.5 weight percent.

7. A process, as set forth in claim 1, wherein the fluorinated organic materials are selected from sodium perfluorohexanoate, sodium perfluorooctanoate, potassium perfluoropalmitate, NH$_4$-perfluorostearate, sodium perfluoroheptylsulfonate, potassium perfluoroduodecylsulfonate, NH$_4$-perfluorooctylphosphate, sodium perfluoropentadecylsulfonate, and sodium salts of perfluoroctanoic acid, and mixtures thereof.

8. A process, as set forth in claim 1, wherein the amorphous polyolefin is dissolved in a hydrocarbon solvent prior to combining the polyolefin with the aqueous solution of fluorinated organic materials.

9. A process, as set forth in claim 1, wherein the fluorinated organic material is sodium perfluorooctanoate.

10. A process, as set forth in claim 1, wherein the polyolefin is polypropylene.

11. A process for the purification of crude amorphous polyolefin, said polyolefin being one of the polymeric products of polymerization under polymerization conditions of at least one monoolefin containing from 2 to about 8 carbon atoms together with from 0 to about 25 weight percent of a comonomer polymerizable therewith and a polymerization catalyst which leaves metal-containing catalyst residues in said polyolefin, comprising:
dissolving the polyolefin in a hydrocarbon solvent;
combining the polyolefin with an aqueous solution of fluorinated organic material selected from a group of materials represented by the formula

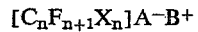

where:

$n=$ an integer in the range of 4–20
$X=$ F, Cl, Br, or H
$A^-=$ CCO$^-$, SO$_3^-$, or PO$_4$H$^-$
$B^+=$ Na$^+$, K$^+$, NH$_4^+$, or H$^+$ with said fluorinated organic materials being in the range of about 0.01 to 1.0 weight percent; and
agitating said combined polyolefin and aqueous solution together at a temperature in the range of about 65–275° F. for a time period in the range of from about 5–60 minutes.

12. A process, as set forth in claim 11, wherein the olefin is polypropylene.

13. A process, as set forth in claim 11, wherein the solvent is one of propane, butane, cyclohexane, heptane, or mixtures thereof.

14. A process, as set forth in claim 11, including removing the agitated polyolefin from the aqueous solution and thereafter agitating the polyolefin with other volumes of the aqueous solution.

15. A process, as set forth in claim 11, wherein the fluorinated organic materials are selected from sodium perfluorohexanoate, sodium perfluorooctanoate, potassium perfluoropalmitate, $NH_4$-perfluorostearate, sodium perfluoroheptylsulfonate, potassium perfluoroduodecylsulfonate, $NH_4$-perfluorooctylphosphate, sodium perfluoropentadecylsulfonate, and sodium salts of perfluoroctanoic acid, and mixtures thereof.

16. A process, as set forth in claim 11, wherein the fluorinated organic material is sodium perfluorooctanoate.

References Cited

UNITED STATES PATENTS 3,197,454   7/1965   Plaster _____ 260—94.9 F

JAMES A. SEIDLECK, Primary Examiner

A. HOLLER, Assistant Examiner

U.S. Cl. X.R.

260—88.2 B, 94.9 F